Figure 1:
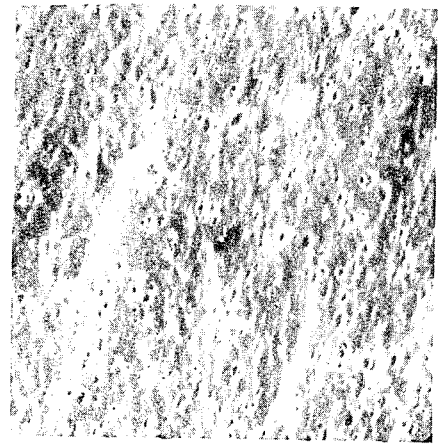
Figure 1:
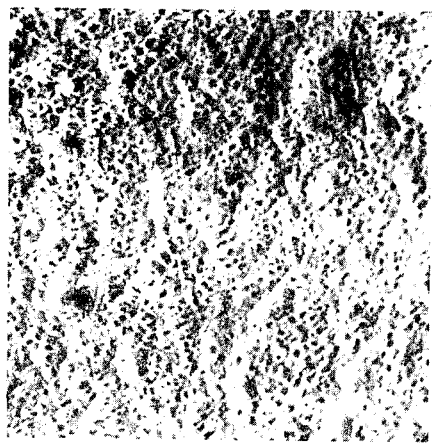
Figure 1:
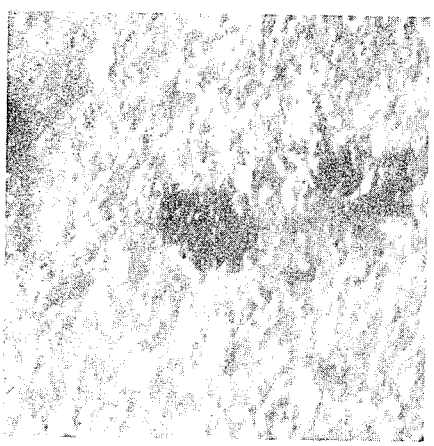

United States Patent

Uda et al.

[15] 3,663,325
[45] May 16, 1972

[54] SURFACE TREATING METHOD FOR MOLDINGS OF POLYSTYRENE TYPE RESINS

[72] Inventors: Kiminori Uda, Yokohama; Hiroya Yamamoto, Tokyo; Naoatu Kasuga, Fujisawa; Kenzi Fuziyoshi, Yokohama, all of Japan

[73] Assignee: Showa Denko K.K., Tokyo, Japan

[22] Filed: June 11, 1970

[21] Appl. No.: 45,337

[52] U.S. Cl. ................................156/2, 117/47, 117/113, 204/32, 252/79.2
[51] Int. Cl. .......................................................C23c 1/00
[58] Field of Search ............................117/47, 113; 156/2, 3; 264/341, 340; 252/79.1, 79.2; 204/22, 30, 32

[56] References Cited

UNITED STATES PATENTS

| | | | |
|---|---|---|---|
| 2,142,968 | 1/1939 | Stoesser | 264/341 UX |
| 2,304,632 | 12/1942 | Faelten | 264/341 X |
| 3,091,553 | 5/1963 | Matsumoto et al. | 156/2 X |
| 3,434,588 | 3/1969 | Kirkpatrick | 156/2 X |
| 3,443,008 | 5/1969 | Boyhan et al. | 156/2 X |
| 3,484,270 | 12/1969 | Saubest et al. | 117/47 |
| 3,515,649 | 6/1970 | Hepfer | 156/3 X |
| 3,567,594 | 3/1971 | Wells | 264/344 X |

Primary Examiner—William A. Powell
Attorney—Kemon, Palmer & Estabrook

[57] ABSTRACT

A surface treating method for moldings of polystyrene type resins wherein there is dispersed in water a solvent selected from the group consisting of aromatic hydrocarbons, chlorinated hydrocarbons, cycloaliphatic hydrocarbons, ketones and esters using a surface active agent to form an aqueous emulsion containing 0.2 to 30 percent by weight of the solvent; the aqueous emulsion is brought into contact with moldings of polystyrene type resin for treatment of their surfaces; the treated surface of the moldings is further chemically etched using a mixed solution of sulfuric acid and dichromic acid; and, if required, the surface is again treated by heated concentrated sulfuric acid.

12 Claims, 2 Drawing Figures

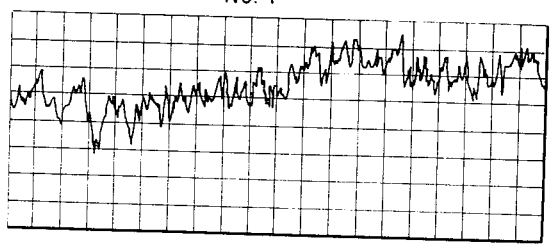
NO. 1
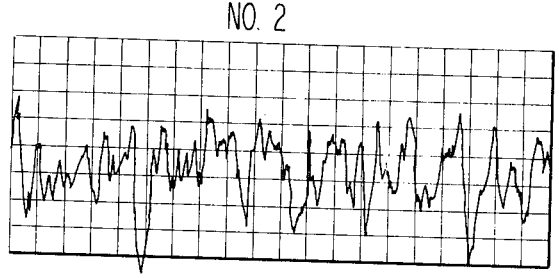
NO. 2
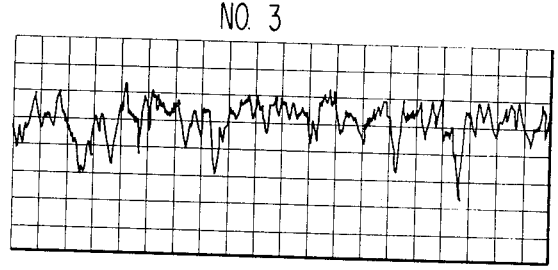
NO. 3

NO. 1

NO. 2

NO. 3

SURFACE TREATING METHOD FOR MOLDINGS OF POLYSTYRENE TYPE RESINS

The present invention relates to a method for subjecting moldings of polystyrene type resins to surface treatment prior to their non-electrode plating in order to improve their adaptability therefor.

Ordinary polystyrene type resins such as general purpose polystyrene (hereinafter referred to as "GPPS-resin"), acrylonitrile-styrene copolymer (hereinafter referred to as "AS-resin"), and high impact polystyrene (hereinafter "HIPS-resin"), except for acrylonitrile-butadiene-styrene interpolymer (hereinafter referred to as "ABS-resin"), have little adaptability for non-electrode plating, so that these resins have heretofore failed to be subjected to non-electrode plating with a practically sufficient peel strength. This is for the reason that since none of the GPPS-, AS- and HIPS-resins has a bond adapted for plating such as the butadiene double bond involved in the ABS-resin, the surface of moldings prepared from the aforesaid resins can not be roughened by chemical etching using a mixed solution of sulfuric acid and dichromic acid which is performed prior to non-electrode plating.

With the GPPS-, AS- and HIPS-resins, therefore, there can not be realized a great peel strength until the surface of a polymer is activated for improvement of the cohesion of a plated metal layer therewith using a different surface roughening technique from that used with the ABS-resin.

The present invention provides a surface treating method for moldings of polysyrene type resins which permits non-electrode plating for polystyrene type resins such as GPPS-, AS- and HIPS-resins which have heretofore failed to be subjected to such plating with a practically sufficient peel strength and also prominently elevates the peel strength of non-electrode plating with respect to other forms of polystyrene type resin, for example, the ABS-resin which have already permitted the appreciable formation of a non-electrode plated layer.

The method of the present invention comprises dispersing in water a solvent selected from the group consisting of aromatic hydrocarbons, chlorinated hydrocarbons, cycloaliphatic hydrocarbons, ketones and esters, bringing the surface of moldings of polystyrene type resins into contact with the resultant aqueous emulsion containing 0.2 to 30 percent by weight of said solvent by dipping or other means and thereafter with a mixed solution of sulfuric acid and dichromic acid for chemical etching, and, where necessary, subjecting said surface to treatment with heated concentrated sulfuric acid, and other conventional treatments for sensitization, activation and chemical plating, thereby permitting the formation of a non-electrode plated layer with a great peel strength.

Figure 2:
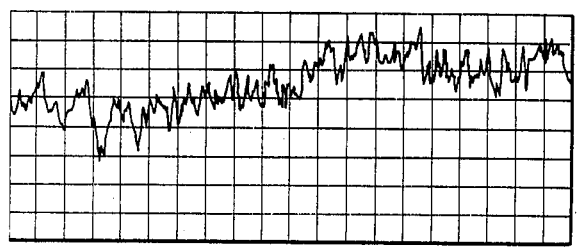
Figure 2:
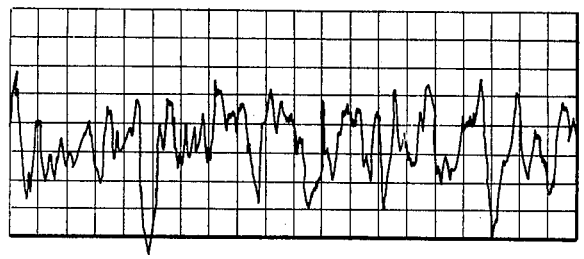
Figure 2:
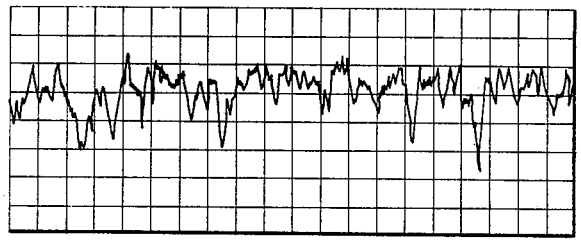

This invention can be more fully understood from the following detailed description when taken in connection with reference to the accompanying drawings, in which:

FIG. 1 represents electronic microscopic pictures comparing the surface condition of a molded plate treated by the method of the present invention with those of an untreated molded plate and a molded plate treated by the prior art method. Picture No. 1 represents the surface condition of an untreated molded plate, No. 2 that of a molded plate treated by the method of the present invention and No. 3 that of a molded plate etched by the conventional method; and FIG. 2 is a chart showing the results of measuring by a surface roughness gauge irregularities on the surface of molded plate samples represented by pictures Nos. 1 to 3 of FIG. 1.

There will now be described the method of the present invention by reference to the preferred embodiments. For the purpose of the present invention, solvents adapted for dispersion in water include aromatic hydrocarbons such as benzene, toluene, xylene and ethyl benzene, chlorinated hydrocarbons such as monochlorobenzene, dichlorobenzene, tetrachloromethane, chloroform, trichroethane, and tetrachloroethane, cycloaliphatic hydrocarbons such as cyclohexane, cyclopentane, ethyl cyclopentane, ketones such as acetone, methyl ethyl ketone, and methyl isobutyl ketone, and esters such as butyl acetate, diethyl malonate, diethyl phthalate, methyl salicylate and ethyl benzoate. All these solvents have the common property of dissolving polystyrene type resins to be subjected to surface treatment. In other words, organic solvents used in the present invention have a solubility parameter (hereinafter referred to as "S.P.") ranging between 7.0 and 11.0. Though such typical organic solvents may be exemplified by monochlorobenzene and toluene, better surface treatment can be effected, instead of using said typical organic solvents alone, by mixing them with cyclohexanes whose S.P. does not too closely approximate the S.P. (9.1) of polystyrene, and controlling the S.P. of the resultant mixture so that it falls within the aforementioned range.

As used herein, the term "solubility parameter" means a parameter of the thermodynamically defined cosolubility of high polymers as described, for example, by J.A.Braydson in "Plastics," December, 1961, page 107, the unit of the parameter being $(cals/sec)^{1/2}$. According to this definition, high polymers having a mutually approximating S.P. are well soluble in each other and those having a mutually remote S.P. are insoluble. Such phenomena are also observed between high polymers and solvents. Therefore, use of a solvent whose S.P. suitably approaches that of polystyrene generally facilitates its dissolution, reducing the time of surface treatment. However, a solvent whose S.P. departs from that of polystyrene rather permits the easy control of treatment, though it requires much time therefor. For this reason, it is advisable to use a mixed solvent whose S.P. is properly controlled.

Where there is prepared an aqueous emulsion by dispersing the aforementioned solvent in water, there is generally added 0.1 to 30 percent by weight of a surface active agent on the basis of the solvent. This surface active agent may suitably consist of a nonionic, anionic or cationic type. Preferable, however, is a combination of nonionic and anionic active agents. Further, the solvent content of an aqueous emulsion preferably ranges from 0.2 to 30 percent (hereinafter, the percent is defined to be by weight). If the solvent content decreases from 0.2 percent, the effect of the present invention will not be fully displayed, failing to carry out the desired surface treatment. Conversely, where the solvent content rises above 30 percent, then the suspended particles of the solvent will become too coarse, so that if moldings of polystyrene resin are treated with such particles the surface will be so roughened as to prevent a smooth layer from being plated thereon, most likely decreasing the peel strength. It is necessary, therefore, that the content of a solvent as particles suspended in an aqueous emulsion be limited to the aforementioned range. In this connection, the size of the solvent particles is preferably 1 micron max. Larger particles than 10 microns are unfavorable in providing a smooth plated surface. Further, it is advisable that the size of the solvent particles be so controlled as to range from 0.2 to 0.5 micron at the peak.

When moldings of polystyrene type resin are dipped in the aforesaid aqueous emulsion for treatment, and etched by a mixed solution of sulfuric acid and dichromic acid, then the surface of said moldings will become adapted for non-electrode plating. The aforementioned special etching enables the surface of moldings of polystyrene type resins to be provided with dovetails, enlarged true contact areas between said surface and the layer plated thereon and larger amounts of functional groups (assumed mainly to consist of a carboxyl group) which are all deemed necessary for elevation of the peel strength of the plated layer, thus resulting in prominent increase in said peel strength. Even if the previously listed organic solvents are diluted by, for example, a separate group of solvents such as ethyl alcohol and n-pentane excluding water which will not affect polystyrene type resins or only slightly swell it, the above-mentioned favorable effect will not be realized.

While the surface treatment according to the method of the present invention noticeably increases, as described above, the adaptability for plating of the surface of moldings of polystyrene type resins, this effect will become more prominent by incorporating in said resins a variety of additives such as fillers and chlorinated polyolefins like chlorinated polyethylene. Again, where said moldings which have already been subjected to ordinary etching using a mixed solution of sulfuric acid and dichromic acid after their surface is treated with the aforesaid aqueous emulsion are further dipped in heated concentrated sulfuric acid of more than 93 percent, then the aforesaid effect will be far more improved. Therefore, most prominently to display the effect of the present invention of improving the adaptability for plating of the moldings, it is advisable to incorporate the previously mentioned additives in polystyrene type resins and dip the moldings in the aforesaid heated concentrated sulfuric acid after they are etched by a mixed solution of sulfuric acid and dichromic acid. However, use of fillers and treatment with concentrated sulfuric acid are subject to a certain limitation according to the applications of the resultant product and accompanied with some economic disadvantage due to increased manufacturing steps. Accordingly, unless there is particularly demanded a great peel strength, it is unnecessary to use the fillers or conduct treatment with the concentrated sulfuric acid. Namely even if moldings of polystyrene type resins only undergo the later described treatments for sensitization, activation and chemical plating in turn after being etched by the aforesaid mixed solution of sulfuric acid and dichromic acid, then there will be obtained a practically sufficient peel strength having a minimum value of 1,000 g./cm.

Moldings of polystyrene type resins whose surface has been treated as mentioned above permit the application of exactly the same non-electrode plating as has heretofore been used with the ABS-resin. The process of this non-electrode plating runs as follows. The moldings of polystyrene type resins whose surface has been treated with the aforesaid aqueous emulsion of a solvent are first subjected to ordinary etching using a mixed solution of sulfuric acid and dichromic acid and, if necessary, dipped in the above-mentioned heated concentrated sulfuric acid so as to be further treated for sensitization and activation. Thereafter, there are adsorbed, for example, a reducing agent and metallic palladium to the surface of moldings thus treated. Next, there is applied the non-electrode plating by chemical means to form a plated layer on said surface, followed by the electrolytic plating of copper or other desired metals.

A layer plated on the surface of polystyrene type resins treated by the method of the present invention exhibits an extremely great peel strength, for example, 1,000 to 2,000 g/cm which fully meets practical applications with respect to the GPPS-, AS- and HIPS-resins which have heretofore presented difficulties in such plating. Even with other polystyrene type resins, for example, the ABS-resin which have already permitted the appreciable formation of a plated layer, the method of the present invention prominently elevates the peel strength of a layer plated thereon.

The present invention will be more clearly understood from the examples which follow.

EXAMPLES 1–4

There were provided samples of GPPS-, HIPS-, AS- and ABS-resins to be used singly and those prepared by dry blending these resins with 10 phr (parts per hundred resin) of fillers consisting of calcium carbonate, aluminum hydroxide, clay, kieselguhr and asbestos respectively. The components of each of the latter samples were mixed 4 minutes in a Bumbury's mixer at a temperature of 170° to 200° C to form a homogeneous mass. The mass was molded into a rectangular plate 3 mm thick by a 5 OZ. screw-in-line injection molding machine. The plate was dipped about 1 minute in an aqueous emulsion at room temperature consisting of 3.5 percent monochlorobenzene as a solvent, 0.1 percent of a nonionic surface active agent (a combination of "Nissan" NS-210 and "Nissan" NS-204.5 commercially so named of Nippon Yushi K. K. (Japan Oils and Fats Mfg. Co., Ltd.)) and water as the remainder. Then the plate was dipped 5 minutes in a mixed solution of sulfuric acid and dichromic acid (which are respectively concentrated at 80 percent by weight of $H_2SO_4$ and 40 g./l. of $CrO_3$) presenting sulfuric acidity, and about 2 minutes in a hydrochloric solution of stannous chloride, and then 1 minute in a hydrochloric solution of palladium chloride at room temperature to sensitize and activate its surface. Thereafter, the plate was immersed about 15 minutes in a commercially available chemical copper plating bath at room temperature, forming a layer of metallic copper 0.3 micron thick on its surface. The plate thus coated was immersed 1 hour in an electrolytic acid copper plating bath, during which time current was introduced at a density of 3 amp./$dm^2$.

A copper layer about 40 microns thick thus electrolytically plated was notched with a width of 10 mm. The copper plates were stretched by a tensile testing machine at the rate of 10 mm./min. and an angle of 90° to determine an average value which was taken as the peel strength g./cm. of the copper plate. The test results are presented in Table 1 below.

TABLE 1

Test results (peel strength g./cm.) in Examples 1 to 4.

| Additive | Example 1 GPPS-resin | Example 2 AS-resin | Example 3 HIPS-resin | Example 4 ABS-resin |
| --- | --- | --- | --- | --- |
| None | 1,700 | 1,260 | 1,800 | 2,500 |
| Calcium carbonate | 2,000 | 1,500 | 2,200 | 2,450 |
| Aluminum hydroxide | 1,850 | 1,300 | 1,850 | — |
| Clay | 1,750 | 1,260 | 1,900 | 2,350 |
| Kieselguhr | 1,900 | 1,700 | 2,030 | 2,350 |
| Asbestos | 1,850 | 1,360 | 1,980 | 2,430 |

CONTROLS 1–4

Plate samples prepared by the same manner as in Examples 1 to 4 were not dipped in the aforesaid aqueous emulsion so as to follow the prior art method. Each sample was chemically etched by a mixed solution of sulfuric acid and dichromic acid. The surface of the sample was further treated and plated in the same manner as in the preceding Examples 1 to 4. The peel strength g./cm. of a layer coated on said surface was determined by the same method as described above, the results being given in Table 2 below.

TABLE 2

Test results (peel strength g./cm.) in Controls 1 to 4.

| Additive | Control 1 GPPS-resin | Control 2 AS-resin | Control 3 HIPS-resin | Control 4 ABS-resin |
| --- | --- | --- | --- | --- |
| None | 80 | 200 | 200 | 1,700 |
| Calcium carbonate | 130 | 250 | 1,00 | 1,750 |
| Aluminum hydroxide | 200 | 210 | 950 | — |
| Clay | 150 | 250 | 810 | 1,530 |
| Kieselguhr | | 2300 | 870 | 1,650 |
| Asbestos | 180 | 280 | 750 | 1,300 |

CONTROL 5

There were prepared samples by blending the HIPS-resin with 10 phr of an inorganic filler consisting of calcium carbonate. The samples were molded into rectangular plates 3 mm. thick by a 5 OZ. injection molding machine. The plates were dipped in 5, 10 and 30 percent ethyl alcohol solutions of monochlorobenzene respectively and subjected to chemical etching and other treatments in the same manner as described above, followed by plating. The peel strength g./cm. of the resultant plated layer was determined by the same method as described above, the results being presented in Table 3 below.

TABLE 3

Test results (peel strength g./cm.) in Control 5.

| Additive | Content of monochlorobenzene (%) | | |
|---|---|---|---|
| | 5 | 10 | 30 |
| None | 220 | 250 | 330 |
| Calcium carbonate | 980 | 1,000 | 1,080 |

As apparent from Examples 1 to 4 in Table 1, Controls 1 to 4 in Table 2 and Control 5 in Table 3, the method of the present invention prominently elevates the peel strength of a plated layer, and a solution prepared by diluting the solvents (for example, monochlorobenzene) used in the present invention with other types of solvent except for water which do not dissolve polystyrene type resins does not attain the effect of the present invention.

FIG. 1 represents the 1,000-time magnified electronic microscopic patterns of the surfaces of molded plates treated according to Example 3 and Control 3. Picture No. 1 shows the surface condition of an untreated molded plate. Picture No. 2 indicates the surface condition of a molded plate which was treated with an aqueous emulsion of a solvent characterizing the method of the present invention and further etched by a mixed solution of sulfuric acid and dichromic acid. Picture No. 3 represents the surface condition of a molded plate which was only etched by said mixed solution of sulfuric acid and dichromic acid according to the conventional method. FIG. 2 displays irregularites on the surfaces of samples associated with the aforesaid pictures Nos. 1 to 3 expressed in delta integrated values, said irregularities being determined by a surface roughness gauge manufactured by Tokyo Seimitsu K. K. (Tokyo Precision Machine Mfg. Co., Ltd.). FIGS. 1 and 2 distinctly prove that the treating method of the present invention provides more numerous and prominent irregularities adapted to elevate the peel strength of a plated layer than has been possible with the prior art.

EXAMPLES 5-8

There were molded plate samples, as in Examples 1 to 4, only from the same polystyrene type resins and also by blending the same fillers therewith. Each sample was chemically etched by a mixed solution of sulfuric acid and dichromic acid presenting sulfuric acidity and dipped 5 minutes in 95 percent concentrated sulfuric acid at 70° C. In other respects, each plate sample was subjected to the same surface treatment as used in Examples 1 to 4, followed by plating. Determination was made of the peel strength g/cm of a layer plated threon by the same method as described above, the results being presented in Table 4 below.

TABLE 4

Test results (peel strength g./cm.) in Examples 5 to 8.

| Additive | Example 5 GPPS-resin | Example 6 AS-resin | Example 7 HIPS-resin | Example 8 ABS-resin |
|---|---|---|---|---|
| None | 1,850 | 1,500 | 2,000 | 2,800 |
| Calcium carbonate | 2,150 | 1,650 | 2,500 | 2,900 |
| Aluminum hydroxide | 2,050 | 1,450 | 2,000 | — |
| Clay | 1,900 | 1,430 | 1,950 | 2,850 |
| Kieselguhr | 2,100 | 1,750 | 2,230 | 2,830 |
| Asbestos | 1,950 | 1,500 | 2,100 | 2,710 |

CONTROLS 6-9

By way of comparison, there were tested plate samples which were treated and plated in the same manner as in Examples 5 to 8, excepting that they did not undergo surface treatment with the aforementioned aqueous emulsion of a solvent. Determination was made of the peel strength of a layer plated on these plate samples, the results being given in Table 5 below.

TABLE 5

Test results (peel strength g./cm.) in Controls 6 to 9.

| Additive | Control 6 GPPS-resin | Control 7 AS-resin | Control 8 HIPS-resin | Control 9 ABS-resin |
|---|---|---|---|---|
| None | 85 | 185 | 250 | 1,740 |
| Calcium carbonate | 125 | 245 | 1,030 | 1,650 |
| Aluminum hydroxide | 230 | 230 | 980 | — |
| Clay | 160 | 268 | 850 | 1,580 |
| Kieselguhr | 230 | 310 | 900 | 1,670 |
| Asbestos | 180 | 275 | 780 | 1,380 |

Comparison of Examples 5 to 8 with Controls 6 to 9 distinctly shows that the surface treatment of the present invention noticeably increases the peel strength of a plated layer and further comparison of Examples 5 to 8 with Examples 1 to 4 proves that the dipping of a chemically etched molded plate in heated concentrated sulfuric acid still more elevates said peel strength.

EXAMPLE 9

There were molded in the same manner as in Example 1 plate samples only from the GPPS-resin used in Example 1, as well as from said resin to which there was uniformly blended 10 phr of calcium carbonate or aluminum hydroxide. Each plate sample was dipped about 1 minute in an aqueous emulsion at room temperature consisting of 7 percent of xylene, 0.7 percent of a nonionic surface active agent (a combination of "Nissan" NS–210 and NS–204.5) and water as the remainder. There were conducted the same operations as in Example 1 to determine the peel strength of a layer plated on the plate sample, the results being given in Table 6 below.

TABLE 6

Test results in Example 9

| Additive | Peel strength (g./cm.) |
|---|---|
| None | 1,800 |
| Calcium carbonate | 2,100 |
| Aluminum hydroxide | 2,150 |

EXAMPLE 10

There were molded in the same manner as in Example 1 plate samples only from the GPPS used in Example 1, also from said resin containing 15 phr of chlorinated polyethylene as an additive, as well as from said mixture to which there was further added 10 phr of calcium carbonate or kieselguhr. Each plate sample was dipped about 1 minute in an aqueous emulsion at room temperature consisting of 10 percent of cyclohexane, 1.5 percent of a nonionic surface active agent and water as the remainder. There were carried out the same operations as in Example 1 to determine the peel strength of a layer plated on the plate sample, the results being presented in Table 7 below.

TABLE 7

Test results in Example 10

| Additive | | Peel strength (g./cm.) |
|---|---|---|
| None | | 1,400 |
| Chlorinated polyethylene | Calcium + carbonate | 1,800 |
| Chlorinated polyethylene | + Kieselguhr | 2,100 |

EXAMPLE 11

There were molded in the same manner as in Example 3 plate samples only from the HIPS-resin used in Example 3 as well as from said resin containing 5 phr of aluminum hydroxide. There were provided emulsions containing 5 percent of methyl ethyl ketone in which there was dispersed the solvent of the present invention by means of a surface active agent consisting of 2 percent. The plate samples were dipped 1 minute in the emulsions. There were performed the same operations as in Example 3 to determine the peel strength of a layer plated thereon, the results being shown in Table 8 below.

TABLE 8

Test results in Example 11

| Additive | Peel strength (g./cm.) |
|---|---|
| None | 1,300 |
| Aluminum hydroxide | 1,700 |

EXAMPLE 12

There were molded in the same manner as in Example 4 only from the ABS-resin used in Example 4, as well as from said resin containing 5 phr of aluminum hydroxide. There was provided an emulsion containing 3 percent of butyl acetate in which there was dispersed the solvent of the present invention by means of a surface active agent consisting of 0.3 percent. Some of the plate samples were dipped 1 minute and the others 3 minutes in the emulsion at 50° C. There were conducted the same operations as in Example 4 to determine the peel strength of a layer plated thereon, the results being given in Table 9 below.

TABLE 9

Test results in Example 12

| Additive | Peel strength (g./cm.) | |
|---|---|---|
| None | 2,500 | 2,850 |
| Aluminum hydroxide | 2,800 | 3,050 |

What we claim is:

1. A surface treating method for moldings of polystyrene type resins which comprises dispersing in water by means of a surface active agent a solvent selected from the group consisting of aromatic hydrocarbons, chlorinated hydrocarbons, cycloaliphatic hydrocarbons, ketones and esters to form an aqueous emulsion in which the content of said solvent ranges between 0.2 to 30 percent by weight, bringing the surface of moldings of polystyrene type resins into contact with said emulsion and then with a mixed solution of sulfuric acid and dichromic acid.

2. A method according to claim 1 wherein the treated surface of moldings of polystyrene type resins is further treated by heated concentrated sulfuric acid having a concentration of more than 93 percent.

3. A method according to claim 1 wherein there is incorporated in said polystyrene type resins an additive selected from the group consisting of inorganic fillers and chlorinated polyolefins.

4. A method according to claim 2 wherein there is incorporated in said polystyrene type resins an additive selected from the group consisting of inorganic fillers and chlorinated polyolefins.

5. A method according to claim 1 wherein the polystyrene type resin is selected from the group consisting of general purpose polystyrene, acrylonitrile-styrene copolymers, high impact polystyrene, and acrylonitrile-butadiene-styrene interpolymers.

6. A method according to claim 2 wherein the polystyrene type resin is selected from the group consisting of general purpose polystyrene, acrylonitrile-styrene copolymers, high impact polystyrene, and acrylonitrile-butadiene-styrene interpolymers.

7. A method according to claim 3 wherein the polystyrene type resin is selected from the group consisting of general purpose polystyrene, acrylonitrile-styrene copolymers, high impact polystyrene, and acrylonitrile-butadiene-styrene interpolymers.

8. A method according to claim 4 wherein the polystyrene type resin is selected from the group consisting of general purpose polystyrene, acrylonitrile-styrene copolymers, high impact polystyrene, and acrylonitrile-butadiene-styrene interpolymers.

9. A method according to claim 1 wherein the solvent is selected from the group consisting of xylene, monochlorobenzene, cyclohexane, methyl ethyl ketone and butyl acetate.

10. A method according to claim 2 wherein the solvent is selected from the group consisting of xylene, monochlorobenzen, cyclohexane, methyl ethyl ketone and butyl acetate.

11. A method according to claim 3 wherein the solvent is selected from the group consisting of xylene, monochlorobenzen, cyclohexane, methyl ethyl ketone and butyl acetate.

12. A method according to claim 4 wherein the solvent is selected from the group consisting of xylene, monochlorobenzene, cyclohexane, methyl ethyl ketone and butyl acetate.

* * * * *